United States Patent [19]

Araoka et al.

[11] Patent Number: 4,605,497

[45] Date of Patent: Aug. 12, 1986

[54] DEVICE FOR PROCESSING FLUID WITH SOLID BODIES

[75] Inventors: Toshinobu Araoka, Kitakyushu; Shigeharu Suzuki, Osaka, both of Japan

[73] Assignee: Toyo Denki Kogyosho Co., Ltd., Kitakyushu, Japan

[21] Appl. No.: 772,261

[22] Filed: Sep. 3, 1985

[51] Int. Cl.4 .............................................. E02F 5/28
[52] U.S. Cl. ..................................... 210/111; 210/112; 210/162; 210/170; 210/171; 210/172
[58] Field of Search ............... 210/162, 163, 170, 171, 210/153, 172, 90, 97, 109, 111, 112, 130

[56] References Cited

U.S. PATENT DOCUMENTS 4,250,034  2/1981  Wolters ............................ 210/170

Primary Examiner—Frank Sever
Attorney, Agent, or Firm—James J. Ralabate

[57] ABSTRACT

A device for processing fluid containing solid bodies is provided which comprises a separation tank with a strainer arranged therein, a fluid discharging suction unit connected to one side of the strainer, and a solid discharge mechanism connected to the other side of the strainer, whereby fluid containing solid bodies such as sludge is processed effectively through separation.

2 Claims, 16 Drawing Figures

DEVICE FOR PROCESSING FLUID WITH SOLID BODIES

BACKGROUND OF THE INVENTION

This invention relates to a processing device for transferring fluid containing solid bodies and separating solid bodies from the fluids.

Hitherto, several types of processing devices for separating solid bodies from fluid are publicly known, one of which is designed so that a vacuum separation tank is connected to a vacuum generating unit such as a water seal type vacuum pump, the vacuum separation tank is communicated with liquid or gas mingled with solid bodies by means of a suction house, and a liquid component is discharged from the vacuum separation tank toward the vacuum generating unit.

In such processing devices as above, however, as liquid or gas containing solid bodies is sucked in, solid bodies etc. also are drawn into the pump, so that the pump tends to be damaged or worn.

In view of such disadvantages, the prior art used a strainer or like member in front of a suction port of the vacuum generating unit to eliminate solid bodies, but a suction power is subject to be decreased due to loading of the strainer, so that the system was shut down frequently. To overcome such drawbacks, the strainer is obliged to be cleaned frequently. This needs the processes of disassembling and cleaning, thus requires many hands and ample maintenance time, thereby results in a decrease of the efficiency of the object work.

SUMMARY OF THE INVENTION

It is an object of the present invention to provide a processing device which discharges solid bodies picked up inside a strainer without need of disassembling of the device of unit and prevents loading of the strainer so that it can discharge solid bodies from the strainer automatically.

To achieve the foregoing object, a device for processing fluid containing solid bodies according to the present invention is improved in that a strainer is provided inside a separation tank, and one side of the strainer is connected to a fluid discharging suction unit with the other side connected to a solid discharging mechanism.

DESCRIPTION OF THE PREFERRED EMBODIMENTS

Embodiments of the present invention to solve the problems of the prior art will now be described in detail with reference to the drawings.

(First embodiment)

Figure 1:
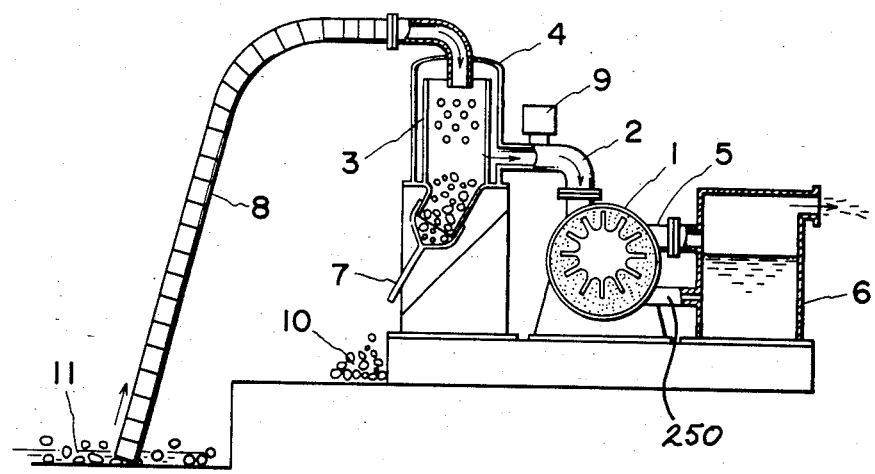
FIG. 1 is a sectional front view of a portion of a device for processing fluid containing solid bodies according to the first embodiment of the present invention.

In FIG. 1, numerical 1 indicates a suction unit, which is a water seal type vacuum pump in this embodiment; but the present invention should not be limited to such pumps. It may be a blower, dry type vacuum pump, or ordinary pump. The suction unit 1 is communicated on one side through a suction pipe 2 with a section inside a separation tank 4, but outside a strainer 3 arranged in the tank. The other side of the suction unit 1 is connected through a discharge pipe 5 to a circulation water tank 6. Numerical 8 is a suction hose, one end of which is dipped in a substance 11 (to be sucked in) containing solid bodies 10 with the other end connected to the upper end of the strainer 3 arranged in the separation tank 4.

Describing the internal configuration of the separation tank 4, the strainer 3 has the lower end opened and is equipped with an open/close valve 7 for discharging outward solid bodies 10 accumulating inside the strainer 3. The open/close valve 7 may be designed so that it can open and close automatically in response to a variation of pressure inside the separation tank 4. In such a case, the valve 7 is closed when the internal pressure of the separation tank 4 is negative and on the other hand laid open when the pressure is identical to the atmospheric pressure.

Although several types of valves can be used as the open/close valve 7, this embodiment forms the valve 7 by a hose body itself, such as a vinyl hose being flexible and strong. When the internal pressure of the separation tank 4 is negative, the pressure difference between the atmospheric pressure overcomes the elasticity of the hose body to close its passage. When the internal pressure becomes identical to the atmospheric pressure, the hose body returns to its original shape to open its passage. That is, such a hose body is made flat and blocked when the separation tank 4 is under a negative pressure, whereas when the atmospheric pressure is restored the hose body assumes a circular cross section to open the passage thereby permitting discharging of solid bodies 10.

The open/close valve 7, however, should not be limited to the foregoing configuration. The valve 7 may be formed by an electromagnetic valve which is actuated by means of a detection signal given from a sensor for detecting a variation of the internal pressure of the separation tank 4.

The transfer and separation work performed by the processing device of the foregoing configuration will now be described. As the suction unit 1 is put in operation, the internal pressure of the separation tank 4 becomes negative, i.e. lower than the atmospheric pressure, and the open/close valve 7 attached to the bottom of the separation tank 4 is pressed by the atmospheric pressure existing on the outside thereof and made flat, so that the passage is blocked. As a result, the separation tank 4 is evacuated and the substance 11 containing solid bodies 10 is sucked into the separation tank 4 through the suction hose 8. Because the strainer 3 is provided in the separation tank 4, the solid bodies 10 remain within the separation tank 4, whereas liquid or gas presses through thru-holes of the strainer 3 and is discharged outward from the suction unit 1 through the discharge pipe 5 and circulation water tank 6 connected to the unit 1. A communication tube 250 connects suction unit 1 with the lower portion of circulation water tank 6.

On the other hand, an air intake valve 9 (such as an electromagnetic valve or hand-operated valve) of sufficient size is attached to the suction pipe 2 or separation tank 4. By introducing the air into the separation tank 4 by means of the above valve or stopping the operation of the suction unit 1, the internal pressure of the separation tank 4 is made identical to the atmospheric pressure. As a result, the solid bodies 10 remaining within the separation tank 4 push and open the open/close valve 7 made of the hose body and are automatically discharged outside the separation tank 1. Through repetition of the foregoing operation the inside of the strainer 3 is cleaned and the solid bodies 10 etc. are collected automatically.

The circulation water tank 6 is provided in order to effect continuous running of the pump because water is not supplemented by any means.

Figure 2:
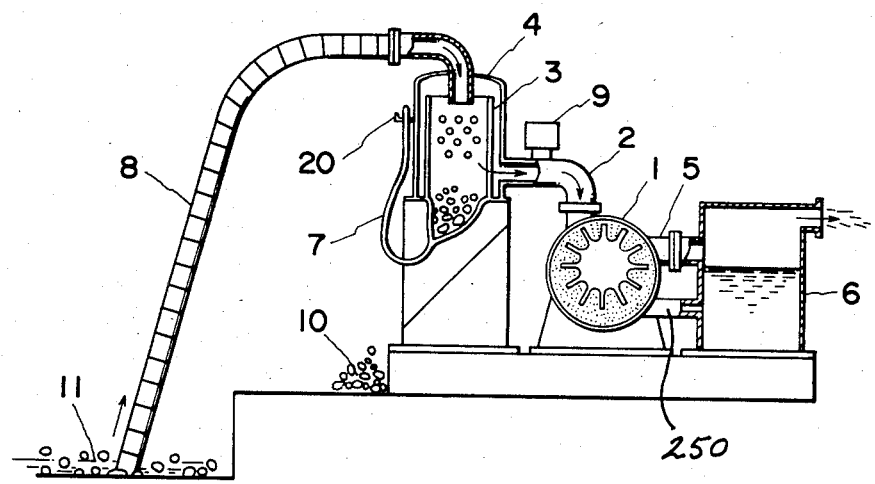
FIGS. 2 through 5 are sectional front views showing a portion each of modifications of the device shown in FIG. 1.

FIG. 2 shows a modification of the processing device shown in FIG. 1. The device shown in FIG. 2 does not permit discharge of the solid bodies even if the open/close valve 7 is opened, except when the open/close valve 7 is taken off from a hose hook 20.

Figure 3:
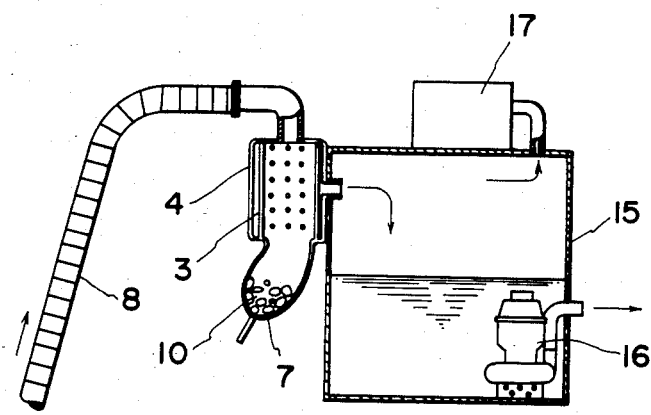
Figure 4:
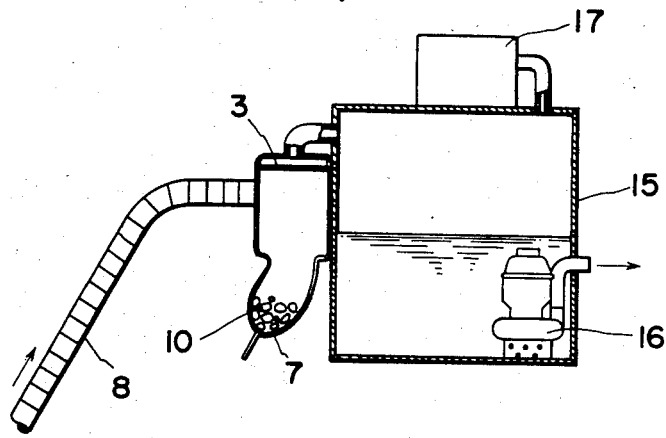
Figure 5:
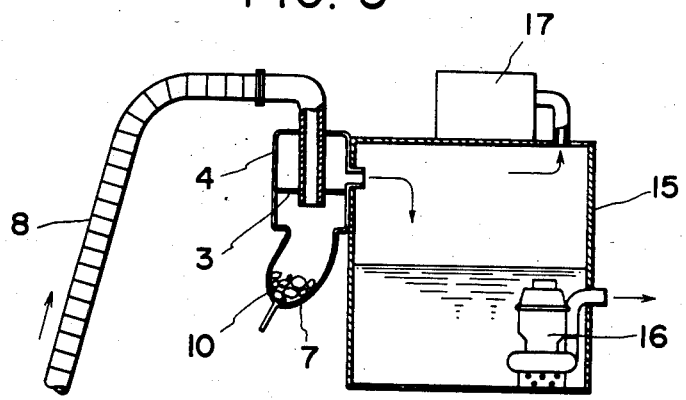
Figure 6:
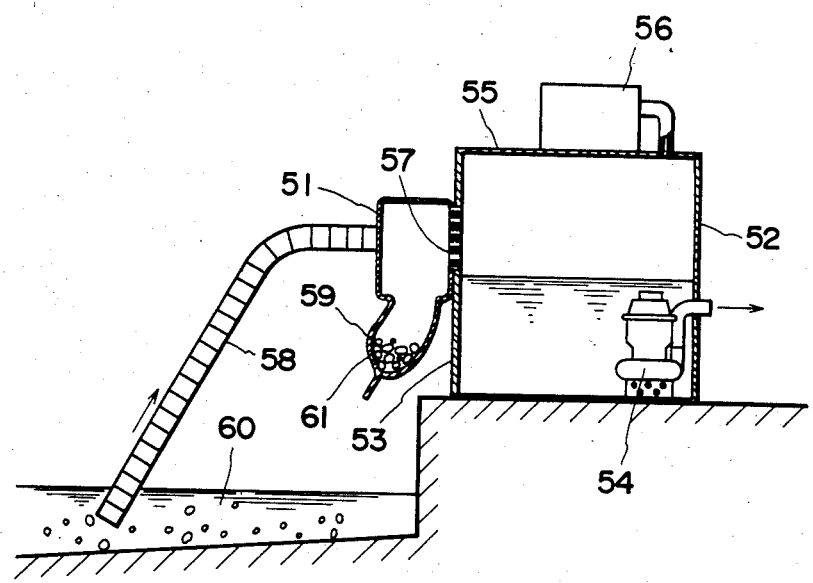
FIG. 6 is a sectional front view of a portion of the second embodiment.
Figure 7:
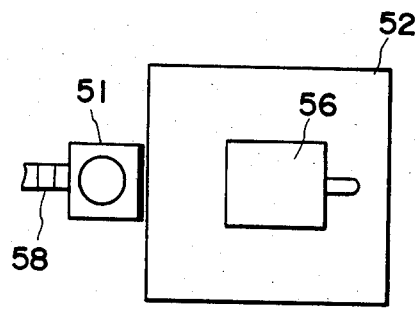
FIGS. 7 and 8 are plane views of the device shown in FIG. 6.
Figure 8:
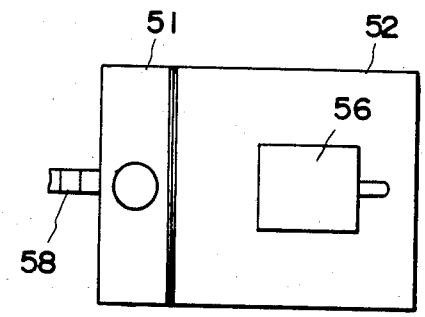
Figure 9:
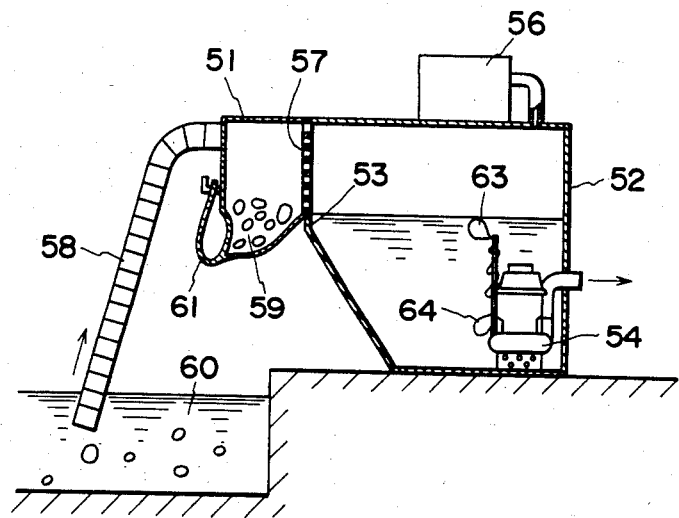
FIGS. 9 through 11 are sectional front views showing a portion each of modifications of the device shown in FIG. 6.
Figure 10:
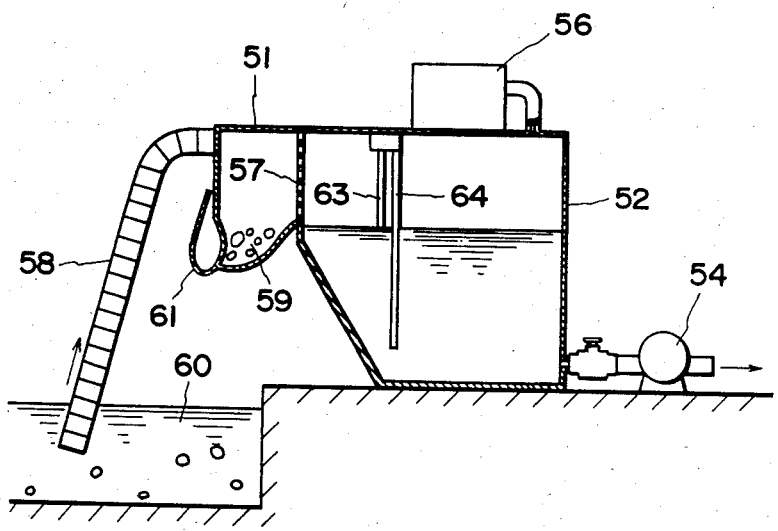

FIGS. 3 through 5 show modifications wherein the separation tank 4 is attached to a liquid storage tank 15. More clearly, the device shown in FIG. 3 is characterized in that the separation tank 4 of the foregoing configuration is provided on a side wall of the liquid storage tank 15, inside the liquid storage tank 15 a discharge pump 16 is provided to discharge liquid, and above the liquid storage tank 15 a vacuum pump 17 is provided. The device shown in FIG. 4 is characterized in that the strainer 3 is provided in an upper section of the separation tank 4, and a compartment above the strainer 3 is connected to the liquid storage tank 15. The device shown in FIG. 5 is characterized in that the strainer 3 is provided at a midway position inside the separation tank 4, one end of the suction hose 8 passes through an upper compartment above the strainer 3 and reaches a lower compartment, and the upper compartment is connected to the liquid storage tank 15.

By the use of the foregoing devices the separated solid bodies can surely be discharged without causing mingling with the separated liquid.

As is apparent from the foregoing description, the embodiment and modifications shown in FIGS. 1 through 5 can separate and eliminate easily and surely solid bodies from the fluid containing solid bodies without need of disassembling of the device.

(Second embodiment)

Figure 11:
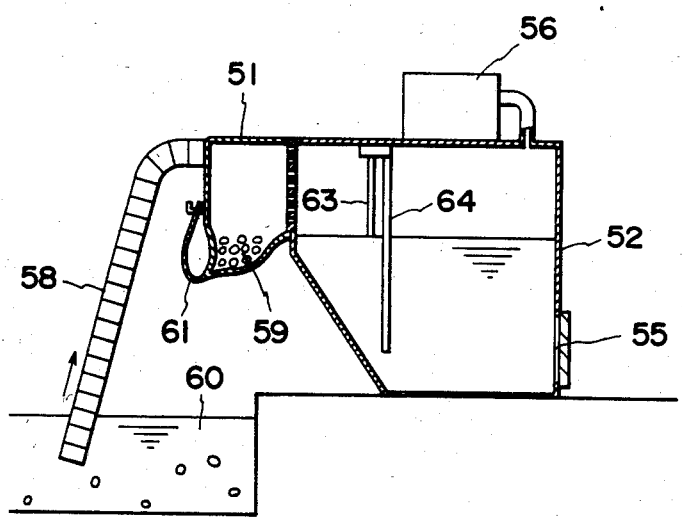
Figure 12:
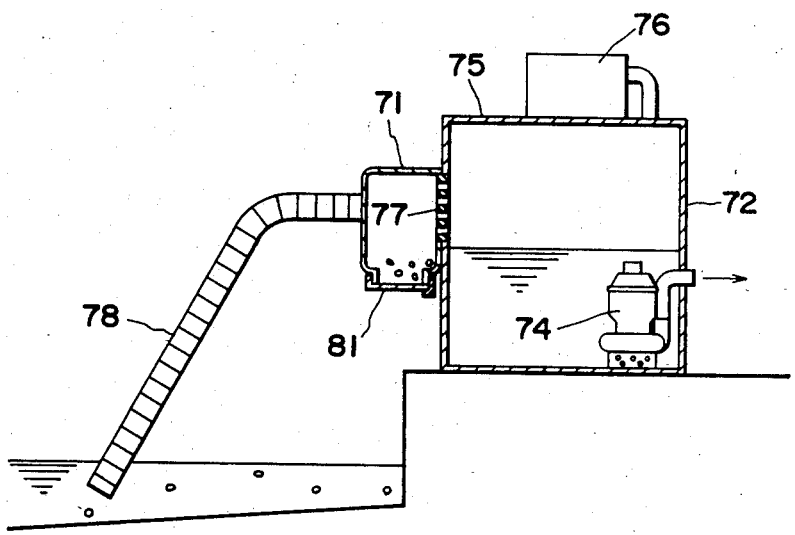
FIG. 12 is a sectional front view of a portion of the third embodiment.
Figure 13:
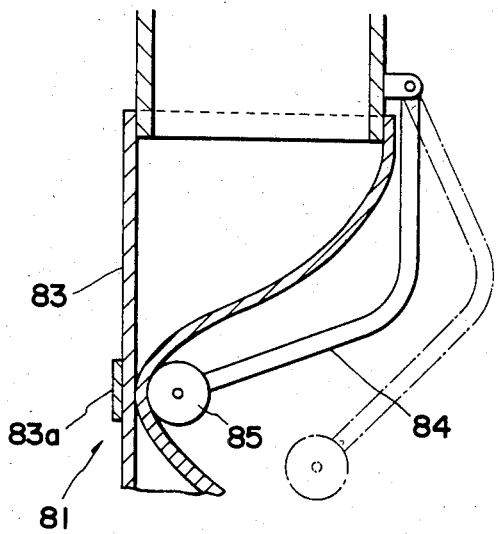
FIGS. 13 through 16 are sectional front views of examples of the simple open/close valve.

The second embodiment shown in FIG. 11 is characterized in that a separation tank 51 is attached to one side of a liquid storage tank 52 with a strainer 57 interposed therebetween, the liquid storage tank 52 is communicated with a suction unit 56, one end of a suction hose 58 whose other end is dipped in the substance containing solid bodies is communicated with the inside of the liquid storage tank 52, and an open/close valve 61 is attached to a lower portion of the separation tank 51, which opens and closes automatically depending upon the internal pressure of the separation tank 51. The separation tank 51 may take a width narrower than that of the liquid storage tank 52 as shown in FIG. 12, or have the same width as that of the tank 52 as shown in FIG. 13. The device shown in FIG. 11 includes further a discharge pump 54 for discharging liquid arranged in the liquid storage tank 52 and a suction unit 56 for evacuating the tank provided on its upper wall 55.

The transfer and separation work performed by the processing device of the foregoing configuration will now be described. As the suction unit 56 is put in operation, the internal pressure of the liquid storage tank 52 and of the separation tank 51 communicated through the strainer 57 with that tank 52 becomes negative, i.e. lower than the atmospheric pressure. As a result, the separation tank 51 is evacuated and a substance 60 containing solid bodies 59 is sucked into the separation tank 51 through the suction hose 58 and tends to flow into the liquid storage tank 52. However, because the strainer 57 is provided between the separation tank 51 and liquid storage tank 52, the solid bodies 59 remain within the separation tank 51, whereas liquid or gas passes through thru-holes of the strainer 57 and flows into the liquid storage tank 52. Thereafter, the liquid is discharged outward by means of a discharge pump 54.

On the other hand, a simple open/close valve 61 is opened thereby causing the solid bodies 59 remaining within the separation tank 51 to be discharged outward spontaneously under the effect of gravity. In the above process, by introducing the air into the separation tank 51 or stopping the operation of the suction unit 56 the internal pressure of the separation tank 51 is made identical to the atmospheric pressure, whereby discharge of the solid bodies 59 from the inside of the separation tank 51 can be promoted.

Figure 14:
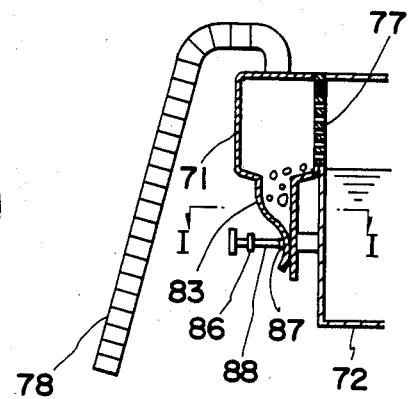
Figure 15:
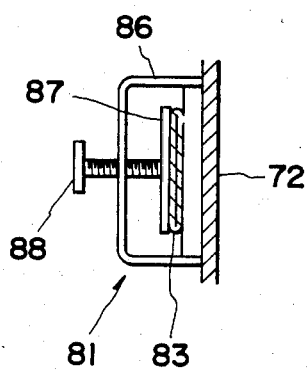
Figure 16:
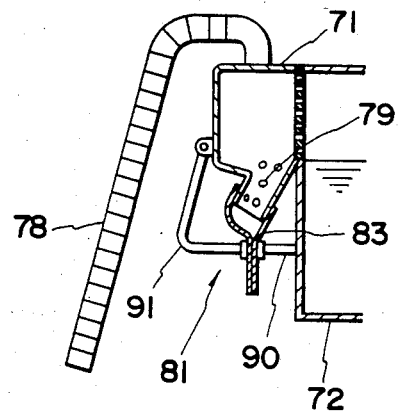

FIGS. 14 through 16 show modifications of the device shown in FIG. 11. More clearly, the device shown in FIG. 14 is characterized in that the distal end of a hose body is hung temporarily on a side wall of the separation tank 51 by means of a hose hook to prevent unexpected opening of an open/close valve 61 formed by the hose body, and liquid level indicators 63, 64 in the form of a float switch are positioned inside the liquid storage tank 52 so that the operation of the discharge pump 54 can be controlled by the actuation of the liquid level indicators 63, 64. The device shown in FIG. 15 is characterized in that the liquid level indicators 63, 64 are of the float switch type, and the discharge pump 54 is positioned outside the liquid storage tank 52. The device shown in FIG. 16 is characterized in that the discharge pump 54 included in the other embodiments is omitted and therefor a drain port 55 is formed simply in the side wall of the liquid storage tank 52.

(Third embodiment)

The third embodiment shown in FIG. 17 is formed by substituting a simple open/close valve 81 similar to that included in the second embodiment for the automatic open/close valve 61 of the third embodiment.

The simple open/close valve 81 shown in FIG. 18 is formed by a flexible cylinder body 83 coupled to an upper member and made of synthetic resin, for example. This cylinder body 83 is opened and closed by pushing one end thereof by means of a push roller 85 attached to the point of an L-shaped lever 84 which in turn is pivoted to a lower end of a separation tank 71, in cooperation with a fixed board 83a. The simple open/close valve 81 shown in FIG. 19 and FIG. 20 (which is a plane view in the direction of the arrow I—I in FIG. 19) is composed of a rigid frame body 86 provided around the flexible cylinder body 83 shown in FIG. 18, and a retractable rod 88 screwed in the frame body 86 which has at its point a push segment 87 for pressing the flexible cylinder body 83. The simple open/close valve 81 shown in FIG. 21 is composed of a rest 90 attached to a side wall of a liquid storage tank 72 and and L-shaped lever 91 whose base end is attached to a side wall of the separation tank 71, so that the flexible cylinder body 83 shown in FIG. 18 is pressed between the point of the lever 91 and rest 90. By urging the L-shaped lever 91 by means of a spring etc. the flexible cylinder body 83 can always be kept closed.

What we claim is:

1. A device comprising means for processing fluid containing solid bodies including a separation tank provided with a strainer therein, a flow path communicating with the inner portion of said strainer for sucking up fluid containing solid bodies, a fluid discharging suction unit communicating with said separation tank and a solid discharging mechanism communicating with the inner portion of said strainer, wherein said fluid discharging suction unit comprises a vacuum pump for sucking up the fluid with solid bodies through said flow path into the inner portion of said strainer and thereafter discharging only fluid throughtout said strainer, and said solid discharging mechanism comprises a change-over valve which automatically opens to discharge or closes to prevent discharge, in response to the internal pressure of said separation tank.

2. In said device for processing fluid containing solid bodies described in claim 1, said change-over valve being forcibly closed when said vacuum pump operates to reduce the internal pressure of said separation tank to negative state relative to the atmospheric pressure, or said change-over valve being automatically opened to exhaust captured solid bodies in said strainer when the internal pressure of said separation tank rises to state equilibrated with atmospheric pressure by the stop motion of said vacuum pump.

* * * * *